(12) United States Patent
Burchard et al.

(10) Patent No.: US 8,037,254 B2
(45) Date of Patent: Oct. 11, 2011

(54) MEMORY CONTROLLER AND METHOD FOR COUPLING A NETWORK AND A MEMORY

(75) Inventors: Artur Burchard, Eindhoven (NL); Ewa Hekstra-Nowacka, Waalre (NL); Atul P. S. Chauhan, Farrukhabad (IN)

(73) Assignee: NXP B.V., Eindhoven (NL)

( * ) Notice: Subject to any disclaimer, the term of this patent is extended or adjusted under 35 U.S.C. 154(b) by 854 days.

(21) Appl. No.: 11/917,018

(22) PCT Filed: Jun. 9, 2006

(86) PCT No.: PCT/IB2006/051837
§ 371 (c)(1),
(2), (4) Date: Dec. 10, 2007

(87) PCT Pub. No.: WO2006/131899
PCT Pub. Date: Dec. 14, 2006

(65) Prior Publication Data
US 2008/0201537 A1     Aug. 21, 2008

(30) Foreign Application Priority Data
Jun. 9, 2005 (EP) .................................... 05105082

(51) Int. Cl.
*G06F 12/00* (2006.01)
(52) U.S. Cl. ................................. 711/154; 711/E12.057
(58) Field of Classification Search ............ 711/E12.057
See application file for complete search history.

(56) References Cited
U.S. PATENT DOCUMENTS
5,777,657 A * 7/1998 Negishi et al. ................ 347/211
(Continued)

FOREIGN PATENT DOCUMENTS
EP          0 982 661 A1     3/2000
(Continued)

OTHER PUBLICATIONS

Rixner, S. 2004. Memory Controller Optimizations for Web Servers. In Proceedings of the 37th Annual IEEE/ACM international Symposium on Microarchitecture (Portland, Oregon, Dec. 4-8, 2004). International Symposium on Microarchitecture. IEEE Computer Society.*

De Kock, et al. "YAPI: Application Modeling for Signal Processing Systems," Proc. of the Design Automation Conf., pp. 402-405 (Jun. 2000).

(Continued)

*Primary Examiner* — Matt Kim
*Assistant Examiner* — John P Fishburn

(57) ABSTRACT

A memory controller (SMC) is provided for coupling a memory (MEM) to a network (N; IM). The memory controller (SMC) comprises a first interface (PI) for connecting the memory controller (SMC) to the network (N; IM). The first interface (PI) is arranged for receiving and transmitting data streams (ST1-ST4). A streaming memory unit (SMU) is coupled to the first interface (PI) for controlling data streams (ST1-ST4) between the network (N; IM) and the memory (MEM). Said streaming memory unit (SMU) comprises a buffer (B) for temporarily storing at least part of the data streams (ST1-ST4). A buffer managing unit (BMU) is provided for managing a temporarily storing of data streams (ST1-ST4) in the buffer (B) in a first and second operation mode (1OM; 2OM). In the first operation mode (1OM), data from the data streams (ST1-ST4) to be stored in the memory (MEM) are temporarily stored in the buffer (B) until a portion of the buffer (B) is occupied. In the second operation mode (2OM), after the portion of the buffer (B) is occupied, the buffer managing unit (BMU) divides the buffer (B) into a pre-fetch buffer (PFB) for buffering pre-fetched data from the memory (MEM) and a write-back buffer (WBB) for buffering data to be written back to the memory (MEM).

7 Claims, 4 Drawing Sheets

U.S. PATENT DOCUMENTS

| | | | |
|---|---|---|---|
| 6,163,818 A * | 12/2000 | Nguyen et al. | 710/22 |
| 2004/0255227 A1 * | 12/2004 | Borsum et al. | 714/790 |
| 2005/0253858 A1 * | 11/2005 | Ohkami et al. | 345/531 |

FOREIGN PATENT DOCUMENTS

| | | |
|---|---|---|
| WO | 2006/059283 A2 | 6/2006 |
| WO | 2006/134550 A2 | 12/2006 |

OTHER PUBLICATIONS

Hennessy, J. et al. "Computer Architecture. A Quantitative Approach" Morgan Kaufmann Publishers, pp. 435-442 (2003).

Burchard, A. et al. "A Real-Time Streaming Memory Controller," Proc. Design Automation and Test in Europe, IEEE, pp. 20-25 (Mar. 2005).

* cited by examiner

MEMORY CONTROLLER AND METHOD FOR COUPLING A NETWORK AND A MEMORY

The present invention relates to a memory controller, and method for coupling a network and a memory.

The complexity of advanced mobile and portable devices increases. The ever more demanding applications of such devices, the complexity, flexibility and programmability requirements intensify data exchange inside the devices. The devices implementing such applications often consist of several functions or processing blocks, here called subsystems. These subsystems typically are implemented as separate ICs, each having a different internal architecture that consists of local processors, busses, and memories, etc. Alternatively, various subsystems, may be integrated on an IC. At system level, these subsystems communicate with each other via a top-level interconnect, that provides certain services, often with real-time support. As an example of subsystems in a mobile phone architecture we can have, among others, base-band processor, display, media processor, or storage element. A PCI Express network is an example of a system level interconnect, providing services like isochronous data transport and flow control. For support of multimedia applications, these subsystems exchange most of the data in a streamed manner. As an example of data streaming, reference is made to read-out of an MP3 encoded audio file from the local storage by a media-processor and sending the decoded stream to speakers. Such communication can be described as a graph of processes connected via FIFO buffers, often referred to as Kahn process networks. The Kahn process network can be mapped on the system architecture, as described in E. A. de Kock et al., "YAPI: Application modeling for signal processing systems". In Proc. of the 37th. Design Automation Conference, Los Angeles, Calif., June 2000, pages 402-405. IEEE, 2000. In such an architecture the processes are mapped onto the subsystems, FIFO buffers on memories, and communications onto the system-level interconnect.

Buffering is essential in a proper support of data streaming between the involved processes. It is quite natural to use FIFO buffers for streaming, and it is in accordance to (bounded) Kahn process network models of streaming application. With increased number of multimedia applications that can run simultaneously the number of processes, real-time streams, as well as the number of associated FIFOs, substantially increases.

Within many systems-on-chip (SoC) and microprocessor systems background memory (DRAM) are used for buffering of data. When the data is communicated in a streaming manner, and buffered as a stream in the memory, pre-fetch buffering can be used. This means that the data from the SDRAM is read beforehand and kept in a special (pre-fetch) buffer. When the read request arrives it can be served from local pre-fetch buffer, usually implemented in on-chip SRAM, without latency otherwise introduced by background memory (DRAM). This is similar to known caching techniques of random data for processors. For streaming, a contiguous (or better to say a predictable) addressing of data is used in a pre-fetch buffer, rather then a random address used in a cache. Reference: J. L. Hennessy and D. A. Patterson "Computer Architecture—A Quantitative Approach"

On the other hand, due to DRAM technology, it is better to access (read or write) DRAM in bursts. Therefore, often a write-back buffer is implemented, which gathers many single data accesses into a burst of accesses of a certain size. Once the initial processing is done for the first DRAM access, every next data word, with address in a certain relation to the previous one (e.g. next, previous—depending on a burst policy), accessed in every next cycle of the memory can be stored or retrieved without any further delay (within 1 cycle), for a specified number of accesses (2/4/8/full page). Therefore, for streaming accesses to memory, when addresses are increased or decreased in the same way for every access (e.g. contiguous addressing) the burst access provides the best performance at the lowest power dissipation. For more information regarding the principles of a DRAM memory, please refer to Micron's 128-Mbit DDRRAM specifications, http://download.micron.com/pdf/datasheets/dram/ddr/128MbDDRx4x8x16.pdf, which is incorporated by reference.

It is an object of the invention to provide a memory controller for coupling a network and a memory as well as a method for coupling a network and a memory, which together with the memory improve the predictable behavior of the communication between the network and the memory.

This object is solved by a memory controller according to claim 1 and by a method for coupling a network and a memory according to claim 6.

Therefore, a memory controller is provided for coupling a memory to a network. The memory controller comprises a first interface for connecting the memory controller to the network. The first interface is arranged for receiving and transmitting data streams. A streaming memory unit is coupled to the first interface for controlling data streams between the network and the memory. Said streaming memory unit comprises a buffer for temporarily storing at least part of the data streams. A buffer managing unit is provided for managing a temporarily storing of data streams in the buffer in a first and second operation mode. In the first operation mode, data from the data streams to be stored in the memory are temporarily stored in the buffer until a portion of the buffer is occupied. In the second operation mode, after the portion of the buffer is occupied, the buffer managing unit divides the buffer into a pre-fetch buffer for buffering pre-fetched data from the memory and a write-back buffer for buffering data to be written back to the memory.

Accordingly, with such a memory controller the buffering management and the buffers can be dynamically configured. When the data is not stored in the background memory but buffered in the buffer of the streaming memory controller, there is only one buffer that serves read and write accesses and implements pre-fetch and write-back buffering. On the other hand, when the data is stored in the background memory this single buffer is dynamically, during run-time, divided into two parts, namely a pre-fetch and a write-back part. Therefore, simpler management of buffers and a better memory utilization is achieved.

According to an aspect of the invention, the first interface is implemented as a PCI-Express interface. With such an interface, the memory controller can be coupled to a PCI-Express network.

According to a further aspect of the invention, a second interface is coupled to the streaming memory unit for connecting the memory controller to the memory and for exchanging data with the memory in bursts. Accordingly, a further interface is provided such that the controller can exchange data with any memory operating in bursts, like a DRAM.

According to still a further aspect of the invention, in the first operation mode the buffer managing unit comprises a start address register for storing the start address of the buffer, an end address register for storing an end address of the buffer, a read pointer register for storing a read pointer of the buffer and a write pointer register for storing a write pointer of the buffer. In the second operation mode, the buffer managing unit comprises a start address register for storing a start address of the buffer, an end address register for storing the end address, a pre-fetch start address register for storing a pre-fetch start address, a pre-fetch end address register for storing the pre-fetch end address, a pre-fetch read pointer register for storing the pre-fetch read pointer, a pre-fetch write pointer register for storing a pre-fetch write pointer, a write-back read pointer register for storing a write-back read pointer, and a write-back write pointer register for storing a write-back write pointer. The buffering within the memory controller can therefore be accomplished by providing four pointers in the first operation mode and by eight pointers in the second operation mode, such that a simple implementation of the buffer managing is provided.

The invention also relates to a method for coupling a network and a memory. Data streams are received and transmitted via a first interface for connecting a memory controller to the network. The data streams between the network and the memory are controlled by a streaming memory unit. At least part of the data streams is temporarily stored in a buffer. The temporarily storing of the data streams in a buffer is managed in a first and second operation mode. In the first operation mode data from the data streams to be stored in the memory is temporarily stored until a portion of the buffer is occupied. In the second operation mode after the portion of the buffer is occupied, the buffer is divided into a pre-fetch buffer for buffering pre-fetch data from the memory and a write-back buffer for buffering data to be written back to the memory.

Other aspects of the invention are subject to the dependent claims.

These and other aspects of the invention are apparent from and will be elucidated with reference to the embodiments described hereinafter and with respect to the following figures.

Figure 1:
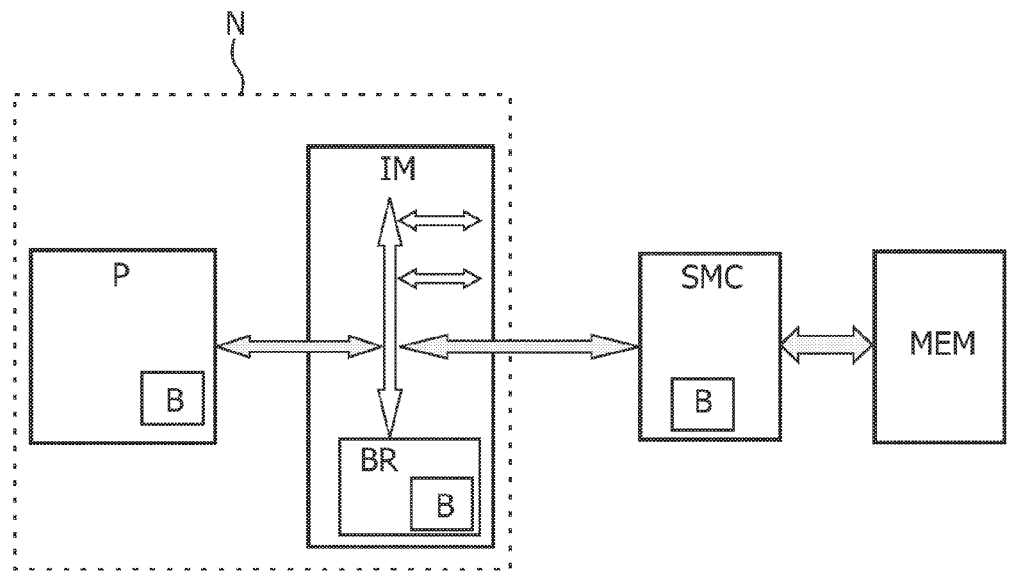
FIG. 1 shows a block diagram of the basic architecture of a system on chip according to the invention.

FIG. 1 shows a block diagram of the basic architecture of a system on chip according to the invention. The system on chip comprises at least one processing unit P (please note that only one processing unit is shown in FIG. 1) or subsystem, an interconnect means IM for coupling the processing units P and any external devices. The processing units P and the interconnect means IM can be considered as a network N. Alternatively, the interconnect means IM may be considered as a network N. The communication over the interconnect means IM and between the processing units P is performed in a streaming manner. An external memory MEM is coupled to the interconnect means IM or the network N via a memory controller SMC. The external memory can be implemented as a SDRAM. The memory controller MC serves to translate data format and the addresses format of the interconnect means IM or the network into data format and address format of the memory MEM.

To implement the stream based communication buffers are provided. The buffer can be placed in a memory controller SMC close to the memory MEM. However, the buffer may also be placed in the interconnect infrastructure (e.g. in an arbiter or in a bridge BR), or even close to the subsystem P, which may be implemented as dedicated ASIC or a microprocessor, accessing the memory MEM. The buffer B will preferably be implemented as a SRAM. Preferably, the FIFO (First-in First-out) principle will be employed to organize the data flow of the data stream through the buffer. Additionally, there may be more then a single buffer implemented in the system. One reason for that would be a differentiation between many streams, and therefore implementing one buffer per single stream.

Preferably, the network constitutes a PCI-Express network. The basic concept of a PCI-Express network is described in "PCI Express Base Specification, Revision 1.0", PCI-SIG, July 2002, www.pcisig.org.

Figure 2:
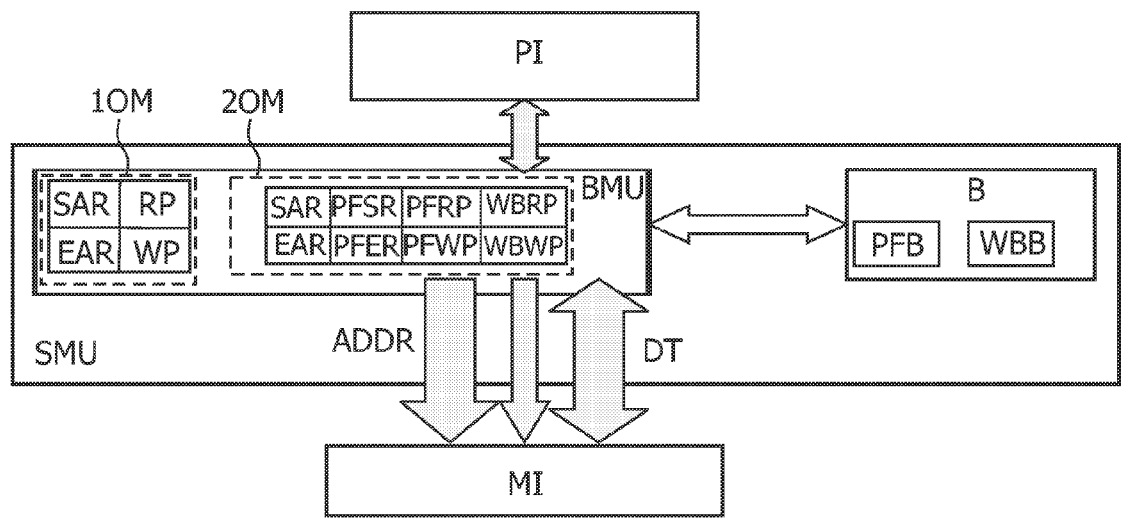
FIG. 2 shows a block diagram of a streaming memory controller according to a first embodiment.

FIG. 2 shows a block diagram of a streaming memory controller SMC according to a first embodiment. The streaming memory controller SMC comprises a PCI-Express interface PI, a streaming memory unit SMU and further interface MI which serves as interface to an external SDRAM memory. The streaming memory unit SMU comprises a buffer manager unit BMU and a buffer B, which may be implemented as a SRAM memory. The streaming memory unit SMU that implements buffering in SRAM, is together with the buffer manager BMU used for buffering an access from the network N via PCI-Express Interface to the SDRAM. The buffer manager unit BMU serves to react to read or write accesses to SDRAM from the PCI-Express Interface, to manage the buffers (update pointer's registers) and to relay data from/to buffers (SRAM) and from/to SDRAM.

According to the first embodiment the data, previously stored separately in a pre-fetch and write-back buffer, is stored together in one input-output buffer. This single input/output buffer is associated with a set of four or eight pointers located in separate registers that are used to point to read and write addresses of the input-output buffer. This single buffer including the set of 4/8 pointers/addresses registers implements shared write-back and pre-fetch buffering that otherwise was treated completely independent.

The buffering management and the buffers according to the first embodiment can be dynamically configured (at runtime). When the data is not stored in the background memory, there is only one buffer that serves read and write accesses and implements pre-fetch and write-back buffering. On the other hand, when the data is stored in the background memory this single buffer is dynamically, during run-time, divided into two parts, namely a pre-fetch and a write-back part. Advantages of this solution are a simpler management of buffers and a better memory utilization.

In other words, the buffering management is performed in two operation modes. In the first operation mode 1OM, a single input/output buffer is provided. The buffer management of this single buffer in the first operation mode 1OM is performed based on four pointers stored in the buffer management unit BMU, i.e. the buffer management unit BMU comprises a start address register SAR, an end address register EAR as well as a read pointer register RP and a write pointer register WP.

In the second operation mode 2OM, the single input/output buffer B is divided into a pre-fetch buffer PFB and a write-back buffer WBB. The buffer management is performed by the buffer manager BMU based on eight pointers, i.e. the buffer managing unit BMU comprises a start address register SAR, an end address register EAR, a pre-fetch start register PFSR, a pre-fetch end register PFER, a pre-fetch read pointer PFRP, a pre-fetch write pointer PFWP, a write-back read pointer register WBRP and a write-back write pointer register WBWP.

Buffering in the streaming memory controller SMC is done to form bursts and to enable burst mode access to DRAM. Therefore, read/write buffers are provided and are implemented in SRAM, i.e. the buffer B. These buffers accumulate packets and form burst. Initially these read and write buffers are implemented in a single buffer and this buffer itself acts as a FIFO buffer and the external DRAM is bypassed. When this buffer becomes full it is split into separate read and write buffer. Then read requests are pre-fetched into this buffer so that read requests are serviced within a latency bound. Write buffers accumulate packets until one full page is accumulated. These write buffers form burst, and transfer data to DRAM, i.e. write back, using burst mode access.

Figure 3:
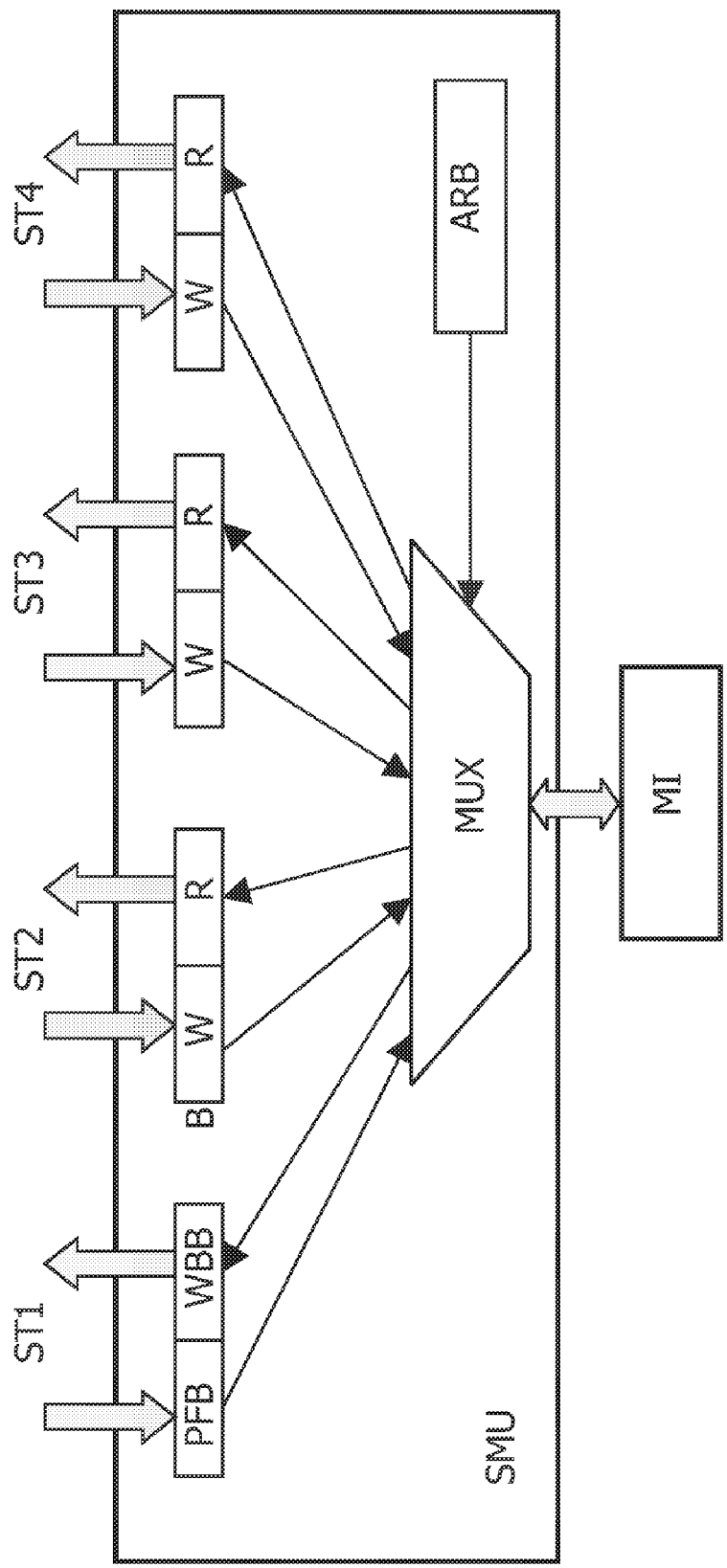
FIG. 3 shows a block diagram of a streaming memory unit of FIG. 2.

FIG. 3 shows a block diagram of a streaming memory unit SMU of FIG. 2. Here, a logical view of a multi-stream buffering is shown. Each of the streams ST1-ST4 are associated to a separate buffer. These buffers are divided into two parts when the data accesses to the external SDRAM is required. As only one stream at the time can access the external SDRAM an arbiter ARB is provided which performs the arbitration in combination with a multiplexer MUX.

Figure 4:
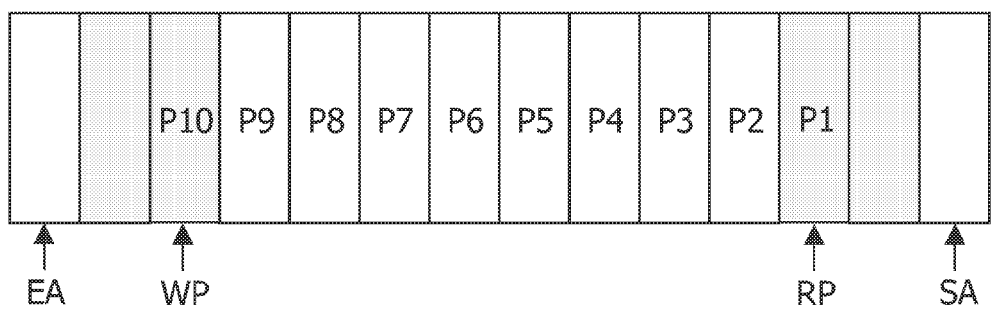
FIG. 4 shows the content of a SRAM buffer of FIG. 3 during a first operation mode.

FIG. 4 shows the content of a SRAM buffer of FIG. 3 during a first operation mode 1OM. During the initialization, the buffer manager unit BMU will allocate a certain amount of a memory space for the buffer. Here, the buffer can contain 14 words. The buffer B will also write the start and end address SA, EA for that buffer in separate registers (2 configuration registers, namely start address register SAR and end address register EAR). The buffer manager BMU also maintains two counters, read counter (read pointer register RR) and write counter (write pointer register WP). These read and write counters or registers, multiplied by word size of the buffer, work as an offset that is to be added to the start address SA of the buffer, to get the address of memory where the data has to be accessed. Hence, the buffer requires 4 pointers, the buffer start and the buffer end addresses stored in the start address register SAR and the end address register EAR, respectively, as well as the read and write addresses or read pointer RP and write pointer WP to implement the buffer management. Here, the data is only buffered in the buffer B and not in the background memory (like a SDRAM). Accordingly, read and write accesses to the buffer manager unit BMU will cause the read and write pointers to dynamically change (increase) wrapping (resetting to the buffer begin) at the end of the buffer.

Figure 5:
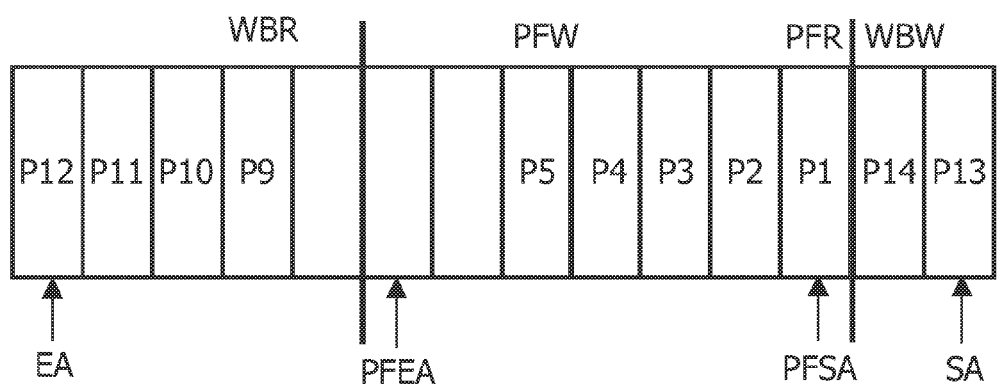
FIG. 5 shows the content of a SRAM buffer of FIG. 3 during a second operation mode.

FIG. 5 shows the content of a SRAM buffer of FIG. 3 during a second operation mode 2OM. If the need occurs to store data to the external SDRAM because for example the buffer is full, or nearly full, the buffer will be split into two parts, namely the pre-fetch and the write-back part PFB, WBB. This may occur at arbitrary moment. The two parts will be dynamically allocated, each of the same size, however not necessarily aligned with the buffer boundaries. In the case of FIG. 5, there 8 pointers (registers), i.e. 4 per each subpart are required.

The required pointers or registers are a start address register SAR for storing a start address SA of the buffer B, an end address register EAR for storing an end address EA of the buffer B, a pre-fetch start address register PFSR for storing a pre-fetch start address PFSA, a pre-fetch end address register PFER for storing a pre-fetch end address PFEA, a pre-fetch read pointer register PFRP for storing a pre-fetch read pointer PFR, a pre-fetch write pointer register PFWP for storing a pre-fetch write pointer PFW, a write-back read pointer register WBRP for storing a write-back read pointer WBR, and a write-back write pointer register WBWP for storing a write-back write pointer WBW.

The buffer manager unit BMU is designed for a joint-buffer management. The read and write counters are 'mod N' counters, i.e. they count up to N and then restarts from 0, wherein $N=(EA-SA)/\text{Buffer}_{13}$ Word size.

For a write request for the Buffer, data is written at address $=SA+(WP^* \text{Buffer\_Word}_{13} \text{ size})$ For a read request for the Buffer, data is fetched from address $=SA+(RP^* \text{Buffer\_Word size})$ The buffer B is empty and reading is blocked for the buffer B, when $(WP-RP)=0$, The buffer B is full and writing is blocked for the buffer B when $(WP-RP) \bmod N=N-1$.

Figure 6:
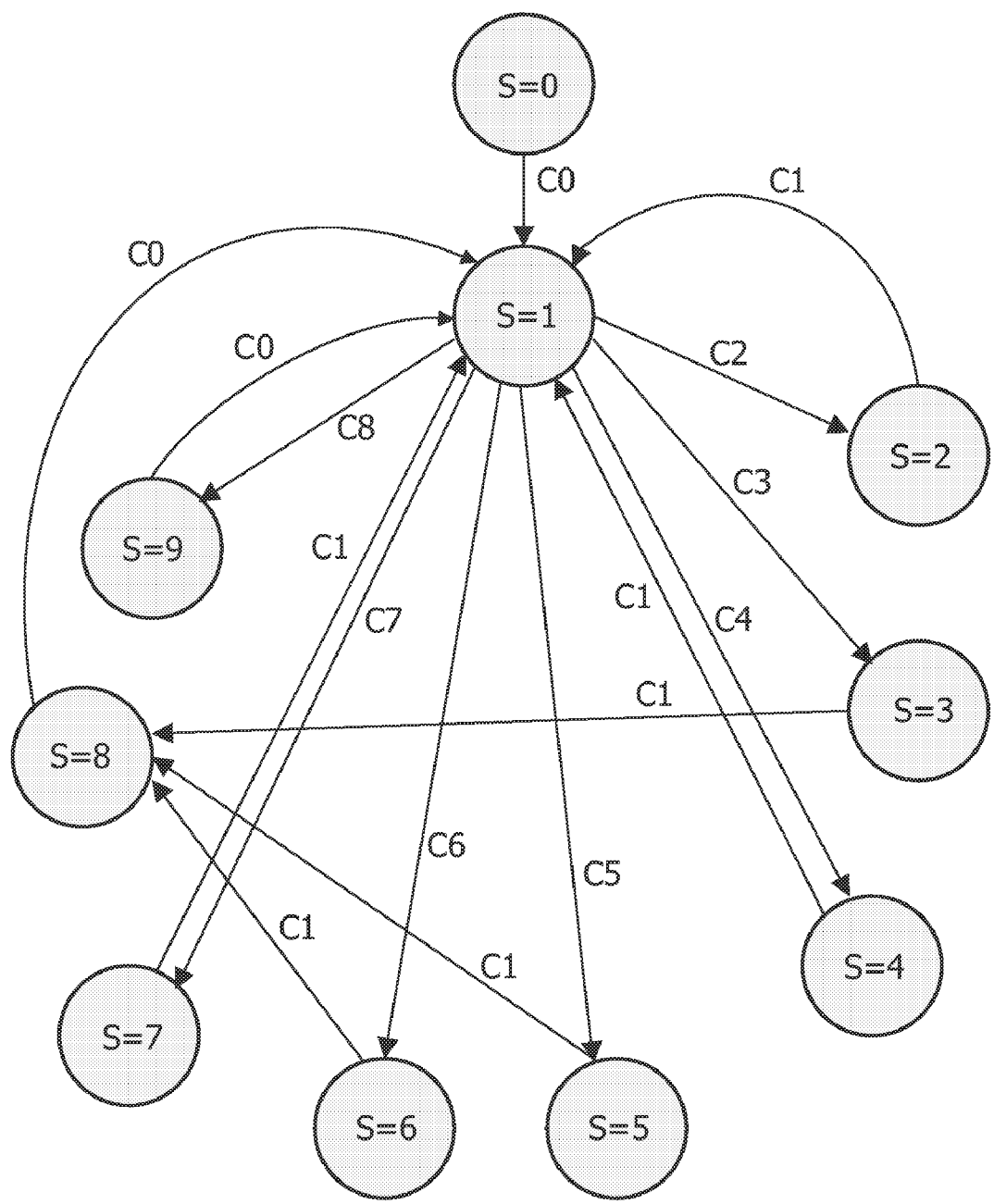
FIG. 6 shows a state diagram of a buffer managing unit of FIG. 2.

FIG. 6 shows a diagram of the different states of a Finite State Machine (FSM) of the buffer manager BMU in particularly for multiple buffers. Here, different states are indicated with different values of S, and the state transitions or conditions are labeled as C. In a situation where the buffer remains in the same state (i.e. multiple accesses for single request) a self loop is required in the state diagram, however this is not depicted in FIG. 6 in order to for simplify of the picture. The state S=0 corresponds to a Reset state. The state S=1 relates to a state having a request for any buffer. Here the type of request is to be determined. The state S=2 relates to a request, which is a read to the SRAM read while the SRAM buffer is not split into read and write buffer. The state S=3 relates to a request which is a write to the SRAM while the SRAM buffer is not split into read and write buffer. The state S=4 relates to a request which is a read to the SRAM while the SRAM buffer has been split into read/write buffer. The state S=5 relates to a request, which is a write to the SRAM buffer while the SRAM buffer has been split into read/write buffer. The state S=6 relates to a data write into the external SDRAM from the write buffer of SRAM buffer. The state S=7 relates to a data read from the external SDRAM and the data is written into the SRAM read (pre-fetch) buffers. The state S=8 relates to a state to wait until memory write has finished (here, wait for one clock cycle). The state S=9 relates to an arbitration, while the other request is in progress (here wait for multiple clock cycles).

A transition from one state to another will occur depending upon the present state and the input to streaming memory controller SMC. The condition C=0 relates to an unconditional transition right after the end of the state. The condition C=1 relates to a conditional transition right after the end of transaction processing (which may take multiple memory accesses) The conditions C=2/3/4/5/6/7 relate to the execution of appropriate memory access (refer to S=2/3/4/5/6/7). The condition C=8 relate to a condition, where a request arrived when another request is processed.

For example, a state transition from S=0 to S=1 occurs for a condition C=0. A state transition from S=1 to S=2 occurs for a condition C=2. A state transition from S=2 to S=1 occurs for a condition C=1. A state transition from S=1 to S=3 occurs for a condition C=3. A state transition from S=3 to S=8 occurs for a condition C=1. A state transition from S=1 to S=4 occurs for a condition C=4. A state transition from S=4 to S=1 occurs for a condition C=1. A state transition from S=1 to S=5 occurs for a condition C=5. A state transition from S=5 to S=8 occurs for a condition C=1. A state transition from S=1 to S=7 occurs for a condition C=7. A state transition from S=7 to S=1 occurs for a condition C=1. A state transition from S=8 to S=1 occurs for a condition C=0. A state transition from S=1 to S=8 occurs for a condition C=8. A state transition from S=9 to S=1 occurs for a condition C=0.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim in numerating several means, several of these means can be embodied by one and the same item of hardware. The mere fact that certain measures are resided in mutually different dependent claims does not indicate that a combination of these measures cannot be used to advantage.

Furthermore, any reference signs in the claims shall not be constitute as limiting the scope of the claims.

The invention claimed is:

1. A memory controller for coupling a memory to a network comprising:
    a first interface for connecting the memory controller to the network, the first interface being arranged for receiving and transmitting data streams; and
    a streaming memory unit coupled to the first interface for controlling the data streams between the network and the memory, said streaming memory unit comprises a buffer for temporarily storing at least part of the data streams, and a buffer managing unit for managing a temporary storing of the data streams in the buffer in a first and second operation mode;
    wherein in the first operation mode, data from the data streams to be stored in the memory are temporarily stored in the buffer until a portion of the buffer is occupied;
    wherein in the second operation mode, after the portion of the buffer is occupied, the buffer managing unit divides the buffer into a pre-fetch buffer for buffering pre-fetched data from the memory and a write-back buffer for buffering data to be written back to the memory.

2. A memory controller according to claim 1, wherein the first interface is a PCI express interface.

3. A memory controller according to claim 1, further comprising a second interface coupled to the streaming memory unit for connecting the memory controller to the memory, and for exchanging data with the memory in bursts.

4. A memory controller according to claim 1, wherein
    the buffer managing unit comprises, in the first operation mode, a start address register for storing a start address of the buffer, an end address register for storing an end address of the buffer, a read pointer register for storing a read pointer for the buffer, and a write pointer register for storing a write pointer for the buffer; and
    the buffer managing unit comprises, in the second operation mode, a start address register for storing a start address of the buffer, an end address register for storing an end address of the buffer, a pre-fetch start address register for storing a pre-fetch start address, a pre-fetch end address register for storing a pre-fetch end address, a pre-fetch read pointer register for storing a pre-fetch read pointer, a pre-fetch write pointer register for storing a pre-fetch write pointer, a write-back read pointer register for storing a write-back read pointer, and a write-back write pointer register for storing a write-back write pointer.

5. A memory controller according to claim 1, wherein the buffer managing unit is adapted to determine the transition from the first to the second operation mode dynamically.

6. Data processing system comprising a network having processing unit, and an interconnect means for coupling the processing units, and a memory controller according to claim 1.

7. A method for coupling a memory to a network, comprising the steps of:
    receiving and transmitting data streams via a first interface for connecting a memory controller to the network;
    controlling the data streams between the network and the memory by a streaming memory unit;
    temporarily storing at least part of the data streams in a buffer;
    managing the temporary storing of the data streams in the buffer in a first and second operation mode;
    in the first operation mode temporarily storing data from the data streams to be stored in the memory until a portion of the buffer is occupied, in the second operation mode after the portion of the buffer is occupied, dividing the buffer into a pre-fetch buffer for buffering pre-fetch data from the memory and a write-back buffer for buffering data to be written back to the memory.

* * * * *